United States Patent

[11] 3,599,503

[72] Inventor Edward H. Schultz, Jr.
 Chicago, Ill.
[21] Appl. No. 866,894
[22] Filed Oct. 16, 1969
[45] Patented Aug. 17, 1971
[73] Assignee Nagel-Chase Manufacturing Company
 Chicago, Ill.

[54] SHEAVE CONSTRUCTION
 8 Claims, 4 Drawing Figs.
[52] U.S. Cl. .................................................. 74/230.8,
 29/159
[51] Int. Cl. ...................................................... F16h 55/44
[50] Field of Search .......................................... 74/230.8,
 230.14, 230.1, 409, 410, 411; 29/159

[56] References Cited
 UNITED STATES PATENTS
1,403,377  1/1922  Barclay ....................... 74/214
1,832,871  11/1931 Meyer ......................... 74/230.8
2,196,923  4/1940  Johanson ..................... 74/230.8
2,610,514  9/1952  Long, Jr. ..................... 74/230.8
3,094,881  6/1963  Schultz, Jr. .................. 74/230.8
3,216,267  11/1965 Dolza .......................... 74/411
3,263,517  8/1966  Cosmos ....................... 74/230.1
3,277,561  10/1966 Joyal .......................... 29/159

Primary Examiner—C. J. Husar
Attorney—Olson, Trexler, Wolters and Bushnell

ABSTRACT: The present invention relates generally to improvements in pulleys or sheaves of the sheet metal type and more particularly to a novel and very practical arrangement whereby such sheet metal parts or stampings may be mounted upon a driving member or bushing. The embodiment of the invention disclosed herein consists of a pair of annular sheet metal members secured in face-to-face relation with the outer margins thereof defining a space for accommodating a belt and the inner margins defining a space for accommodating the outer periphery of the yieldable coupling collar. This collar may be made of suitable rubberlike yieldable material, such as Neoprene, and the outer periphery thereof is firmly impinged by the inner margins of the sheet metal members. The inner margin of the collar aggressively impinges or is bonded to the outer periphery of a driving member such as a bushing.

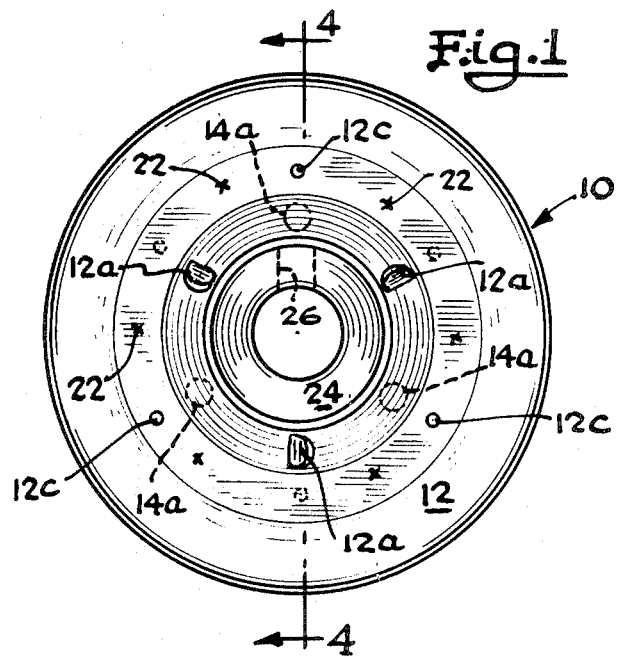
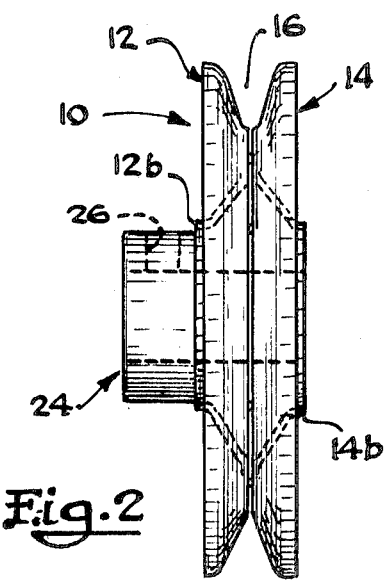
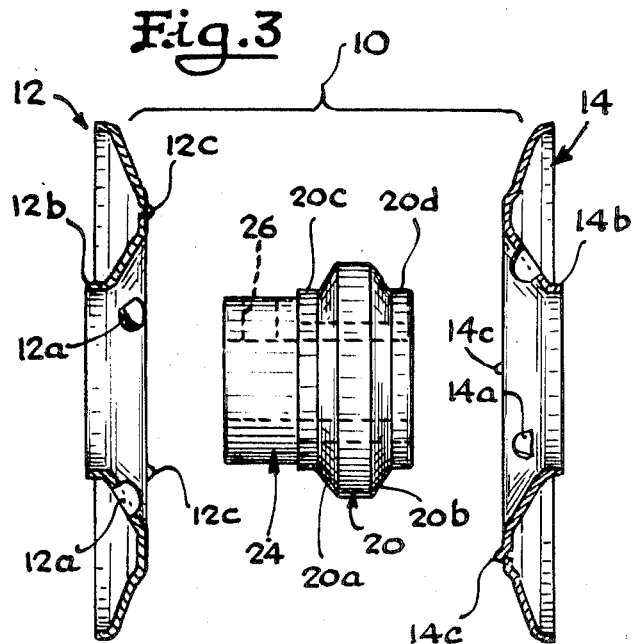
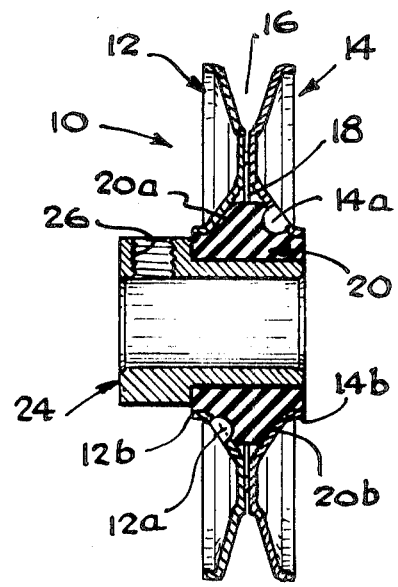
Inventor
Edward H. Schultz Jr.
By Olson, Trexler, Wolters & Bushnell
Attorneys

SHEAVE CONSTRUCTION

Applicant has for many years been engaged in the development of pulleys or sheaves which have practical application in an environment where it is important to reduce to a minumum noise resulting from the operation of machinery in which sheaves are embodied as a driving, or driven part. The noise factor is of particular significance in equipment such, for example, as power-driven household laundry equipment. With this in mind the applicant has developed a new and improved sheave construction which contributes materially to the reduction of noise and which may be produced at minimum cost.

More specifically the present invention contemplates a new and improved sheave structure of the type referred to above wherein the central or hub portion is of novel design to absorb shocks to which the sheave may be subjected.

Still more specifically it is an object of the present invention to provide a sheave of the type set forth above in which a pair of annular sheet metal plates forming the body of the sheave are cushioned at their central portions so as to absorb operational noises and at the same time provide a very effective coupling between said sheet metal body portions and a drive shaft or bushing.

The foregoing and other objects and advantages will be more apparent from the following detailed description when considered in connection with the accompanying drawing, wherein:

FIG. 1 is a side elevational view of a sheave which is representative of one embodiment of the present invention;

FIG. 2 is an edge view of the sheave as seen from the right of FIG. 1;

FIG. 3 is an exploded view showing the sheet metal side plates in section and axially separated from the combined bushing and yieldable collar; and, FIG. 4 is a transverse central sectional view taken substantially along the line 4—4 of FIG. 1.

Refer now to the drawing more in detail wherein like numerals have been employed to designate similar parts throughout the various Figures It will be seen that a pulley or sheave is designated generally by the numeral 10. The sheave 10 includes a pair of identical side plates, or annular sheet metal members 12 and 14. The outer margins of the plates 12 members 14 are deflected axially so that when the plates are juxtapositioned as shown in FIGS. 2 and 4, a belt accommodating annular space 16 is presented. The inner margins of the plates 12—14 are also deflected axially so as to provide a space 18 for accommodating the outer periphery of a firmly resilient collar 20.

It will be noted that the outer periphery of the firmly resilient or Neoprene collar 20 is in the form of an annular ridge which fits snugly within the space 18 and bears against the adjacent walls of the inner margin of the plates 12—14. The plates 12—14 are secured together along an annular area positioned intermediate the inner and outer margins thereof as by means welds 22. To effect more aggressive impingement of the inner margins of the plates 12—14 against frustoconical surfaces 20a and 20b, equally spaced struck out protuberances 12a are provided on the plate 12 and similar struck out protuberances 14a are provided on the plate 14. Attenuation is directed to the fact that the protuberances 12a bite into the frustoconical surface 20a at points which are circumferentially spaced from the points at which the struck out protuberances 14a engage the frustoconical surface 20b. The plates 12 and 14 are identical structurally, and hence may be produced in a conventional stamping and forming press.

Each of the struck out protuberances 12a and 14a are inclined with respect to the surface from which they are struck. In this manner the aggressiveness with which the protuberances impinge the surfaces 20a and 20b to prevent relative rotation between the parts is materially enhanced. A flange 12b of the plate 12 adjacently encircles a complementary cylindrical surface 20c of the coupling collar 20, and a corresponding flange 14b of the plate 14 adjacently encompasses a complementary surface 20d of the collar. The collar 20 is preferably bonded to the outer periphery of a bushing member 24. An enlarged portion of the bushing 24 is threaded at 26 to accommodate a conventional setscrew nut shown. To facilitate welding the inner surface of each of the plates 12 and 14 are dimpled to facilitate subsequent welding as indicated in FIG. 3. The dimples associated with the plate 12b are indicated by the numeral 12c and the dimples associated with the plate 14 are indicated by the numeral 14c.

From the foregoing it will be apparent that sheaves constructed in accordance with the teachings of the present invention will operate substantially free of the noise which is usually emitted from conventional pulleys or sheaves. The presence of the resilient or cushioning collar not only provides an effective noise reducer, but also a very satisfactory coupling between the inner margin of the plates 12—14 and the bushing. Protuberant means in the form of the stamped out elements 12a and 14a have proven very satisfactory in providing the required aggressive impingement between the inner margin of the plates 12—14 and the coupling collar 20. The elements which comprise the sheave are simple in structure and may be produced by conventional shop methods. After the above-mentioned parts have been properly positioned and the plates 12 and 14 clamped together, the plates may be spot welded as previously mentioned. Hence the final assembly of the parts may be accomplished with great facility.

The invention I claim is as follows:

1. A sheave arrangement including a pair of annular sheet metal members disposed in face-to-face relation, the outer annular margins thereof being laterally flared to provide an outer first annular space for accommodating a belt, the inner annular margins of said members being laterally flared to provide an inner second annular space for accommodating a yieldable coupling collar, means securing the intermediate annular portions of said sheet metal members in juxtaposition, a bushing member positioned centrally of said sheet metal members, a yieldable coupling collar having an outer annular section positioned within and conforming generally in cross-sectional shape with said second annular space, said annular section being impinged firmly by the inner facing surfaces of the flared margins of said annular members, the inner periphery of said collar impingingly encircling the periphery of the bushing, and means positioned along the inner flared surfaces defining said second annular space for increasing the impinging aggressiveness with the annular section of the collar.

2. A sheave arrangement as set forth in claim 1, wherein the inner collar-impinging margins of said members are provided with protuberant means for increasing the impinging aggressiveness with the outer periphery of the annular section of the collar.

3. A sheave arrangement as set forth in claim 2, wherein the protuberant means are in the nature of protuberances struck from the inner margins of the annular members toward said annular section.

4. A sheave arrangement as set forth in claim 2, wherein the protuberant means are in the nature of circumferentially spaced struck out portions inclined with respect to the surface from which they are struck.

5. A sheave arrangement as set forth in claim 1, wherein the inner periphery of the yieldable collar is bonded to the outer periphery of the bushing.

6. A sheave arrangement as set forth in claim 1, wherein the yieldable coupling collar is constructed of material having the firm resilient qualities of relatively hard artificial rubber.

7. A sheave arrangement as set forth in claim 1, wherein the annular section of said yieldable coupling collar comprises an annular ridge defined by opposed conical surfaces impinged firmly by complementary inner margins of the annular members.

8. A sheave arrangement as set forth in claim 1, wherein the inner collar-impinging margins of the annular member include elements struck inwardly from said margins in the form of inclined lugs, the inclination of the lugs on one annular member being opposite to the inclination of the lugs on the other annular member whereby to effectively resist forces tending to relatively rotate the annular members with respect to the collar.